United States Patent Office 3,102,877
Patented Sept. 3, 1963

3,102,877
POLYMERIZATION CATALYSTS CONTAINING GROUP IVB METAL DIOXIDES HAVING HALOGEN CHEMICALLY BOUND THERETO
James C. MacKenzie, Wellesley Hills, Mass., assignor to Cabot Corporation, Boston, Mass., a corporation of Delaware
No Drawing. Filed Aug. 5, 1959, Ser. No. 831,710
9 Claims. (Cl. 260—93.7)

This invention relates to the polymerization of α-mono-olefins such as ethylene and propylene and the copolymerization of diverse α-mono-olefins and includes within its scope improved catalysts for such polymerization reactions comprising a halogenated group IVB metal oxide in combination with an organometallic compound of a group I, II or III metal. The group numbers correspond to the periodic system wherein group IVB comprises titanium, zirconium, thorium and hafnium.

Accordingly, it is a principal object of the present invention to provide a novel process for polymerizing α-mono-olefins and mixtures thereof.

Other objects of the present invention will in part be obvious and will in part appear hereinafter.

It is known that α-mono-olefins can be polymerized by contact with a catalyst comprising an oxide of a group IVB metal in combination with an organometallic compound.

However, in accordance with the present invention, it was discovered that an enormously more efficient catalyst is produced when the group IVB metal oxide is surface halogenated prior to mixing with the organometallic compound. The polymerization or copolymerization reaction can be effected at suitable temperatures within the range of from about −20° C. to about 250° C., and pressures ranging upwardly from atmospheric to any desired maximum pressure, for example, 30,000 p.s.i.g. or even higher pressures, but preferably between about 200 and about 5000 p.s.i.g.

In the interests of brevity and clarity only the chlorinated oxides of said metals are initially mentioned and discussed in the specification. Clearly other surface halogenated IVB metal oxides such as brominated and iodinated IVB metal oxides are suitable for the purposes of the present invention. Accordingly, it is desired that it be clearly understood that chlorinated oxides are utilized merely as specific examples for the purposes of illustration, that other halogenated oxides can be utilized for the purposes of the present invention and that the initial mention of only chlorinated oxides is not intended to limit the present invention in any way.

Halogenation of the group IVB metal oxides can be accomplished in a number of ways: Specifically, chlorination can be accomplished by (a) treatment with thionyl chloride at temperatures between about 25° C. and 100° C. for about 5 hours, (b) treatment with gaseous chlorine at temperatures between about 100° C. and 800° C. for periods from about 15 minutes up to about one hour, and (c) treatment with hydrogen chloride gas at temperatures between about 150° C. and 500° C. and from about 15 minutes to about 2 hours. Many other chlorinating agents such as carbon tetrachloride, silicon tetrachloride, carbon monoxidechlorine mixtures, phosgene and the like are also suitable for the purposes of the present invention. However, it should be pointed out that care must be taken during the surface halogenation operation to the end that the halogenation not be carried too far. For example, in the process of surface chlorinating titanium dioxide, care should be taken to the end that substantial amounts of titanium tetrachloride not be produced, because under severe chlorinating conditions titanium tetrachloride can be produced. Accordingly, the conditions, primarily the temperature, must be effectively controlled during chlorination in order to prevent the production of titanium tetrachloride. Although such completely halogenated compounds, e.g. titanium tetrachloride, can be removed by extraction, it is obviously more desirable to avoid additional steps. Suitable conditions for the avoidance of the production of appreciable amounts of completely halogenated metal compound for any particular group IVB metal oxide in combination with any particular halogenating agent can be readily determined.

The manner in which halogenation of the oxides is accomplished is not critical. Specifically, halogenation can be accomplished (a) in a fixed bed by flowing the halogenating agents, such as $Cl_2$, $Br_2$, etc., therethrough (b) in a closed container by immersing the oxides to be treated in a suitable solution such as a solution of carbon tetrachloride, (c) by exposing the oxides to vapors of the halogenating agents, such as HCl vapors, and in many other ways.

Neither is the extent of halogenation of the said metal oxides highly critical. However, the efficiency of the surface halogenated oxides of this invention as catalyst components in the systems described, e. g. in terms of grams of polymer producible per gram of catalyst employed, is generally highly dependent upon the relative amount of halogenated metal oxide present on the surfaces thereof. This in turn is dependent largely on two main factors, each of which is separately controllable to a large extent. The first factor in question is the molar quantity of group IVB metal available in the surface per weight of the material to be surface halogenated. For an oxide of a given metal this first factor is largely a matter of the fineness of subdivision of the form in which said oxide is available, the upper limit clearly being reached when it is so fine that substantially all of the said group IVB metal oxide present is on the surface. The second factor in question is the proportion of the said IVB metal oxide which is actually surface halogenated.

In view of the above discussion it is clear that in preparing surface halogenated oxides starting with solid oxides of any given group IVB metal, the smaller the average particle size of said solid oxide, the greater will be the potential efficiency of the resulting catalyst component producible therefrom. However, because of the enormously greater catalytic activity of the surface halogenated group IVB metal oxides compared to the ordinary group IVB metal oxides, the fineness of particle size of the oxides is not nearly so important in the present case as in my copending U.S. patent application Serial No. 831,711, now abandoned, filed on even date herewith, covering catalysts based on the ordinary group IVB metal oxides. As a matter of fact, in the present case, it is nearly feasible to use as the starting material (in making the surface halogenated oxides of the present invention) solid group IVB metal oxides having an average equivalent particle diameter even greater than 1 micron, e.g. 3μ.

In short, to reduce this discussion of extent of halogenation to the simplest possible terms, it is believed the extent of halogenation of the surface halogenated group IVB metal oxides of the present invention can best be described and specified as follows: Preferred for imparting optimum catalytic activity and providing maximum catalyst efficiencies when used with a given organometallic compound in a given system are those surface halogenated group IVB metal oxides in which the extent of said surface halogenation amounts to between about 0.1 and about 10 milliequivalents of halogen per gram of said surface halogenated oxide. Still quite useful and practical, however, particularly when for other reasons amounts of 1 part or more by weight of the surface halogenated group IVB metal oxide per 100 parts of the polymer product are desired, are those surface halogenated group IVB metal oxides in which the extent of surface halogenation totals as little as 0.01 milliequivalent of halogen per gram of said surface halogenated oxide.

In accordance with the present invention, it was also discovered that the superior catalysts of the present invention are formed when the aforesaid surface halogenated group IVB metal oxides are combined with any compound conforming to the general formula:

$$MM'_vX_nR_{y-n}$$

wherein M is a metal chosen from groups I, II or III of the periodic table; M' is a metal of group I of the periodic table; $v$ equals 0 or 1; each X is a halogen; $n$ equals 0, 1 or 2; each R is any monovalent hydrocarbon radical or hydrogen; $y$ equals 1, 2, 3 or 4; and wherein $y-n$ equals at least 1.

Compounds of a single group I, II or III metal which are suitable for the practice of the invention include compounds conforming to the subgeneric formula:

$$M(R)_k$$

wherein M is a group I, II or III metal, such as, lithium, sodium, beryllium, barium, boron, aluminum, copper, zinc, cadmium, mercury and gallium; wherein $k$ equals 1, 2 or 3 depending upon the valency of M which valency in turn depends upon the particular group (i.e. I, II or III) to which M belongs; and wherein each R may be any monovalent hydrocarbon radical. Examples of suitable R groups include an aryl or alkaryl radical, aliphatic hydrocarbon radical or derivative, such as alkyl, cycloalkylalkyl, cycloalkenylalkyl, arylalkyl, cycloalkyl, alkylcycloalkyl, arylcycloalkyl, cycloalkylalkenyl.

Specific examples of R groups for substitution in the above formula include methyl, ethyl, n-propyl, isopropyl, isobutyl, n-amyl, isoamyl, hexyl, n-octyl, n-dodecyl, and the like; 2-butenyl, 2-methyl-2-butenyl and the like; cyclopentylethyl, 4-cyclohexenylethyl and the like; 2-phenylethyl, 2-phenylpropyl, α-naphthylethyl, methylnaphthylethyl, and the like; cyclopentyl, cyclohexyl, 2,2,1-bicycloheptyl, and the like; methylcyclopentyl, dimethylcyclohexyl, ethylcyclohexyl, isopropylcyclohexyl, 5-cyclopentadienyl, and the like; phenylcyclohexyl, and the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, and cyclohexylphenyl.

Generally preferred, however, are group I, II and III metal alkyls, such as methyl- and butyllithium, pentenylsodium, cyclopentadienylsodium, dihexylmercury, diallylmagnesium, diethylcadmium, benzylpotassium, divinylmagnesium, di-p-tolylmercury, diethylzinc, tri-n-butylaluminum, methyl phenylmercury, diisobutyl ethylboron, diethylcadmium, di-n-butylzinc and tri-n-amylboron, and in particular the aluminum alkyls, such as trihexylaluminum triethylaluminum, trimethylaluminum, and in particular, triisobutylaluminum.

In addition, mono- and di-halides of group II or III metals conforming to the above general formula are also suitable. Specific examples of such compounds are diisobutylaluminum bromide, isobutylboron dichloride, methylmagnesium chloride, phenylmercuric iodide, ethylberyllium chloride, ethylcalcium bromide, hexylcupric chloride, diisobutylaluminum hydride, methylcadmium hydride, diethylboron hydride, hexylberyllium hydride, dipropylboron hydride, octylmagnesium hydride, butylzinc hydride, dichloroboron hydride, dibromoaluminum hydride and bromocadmium hydride.

Also, compounds comprising a group I, II or III metal compound complexed with a group I metal compound if they conform to the above general formula, are generally suitable. Examples of such compounds are tetraethyllithium aluminum, tetrahexyllithium aluminum, trihexylpotassium aluminum chloride, triethyllithium aluminum bromide, tributylsodium zinc, tributyllithium zinc, trioctadecylpotassium aluminum hydride, diphenyldilithium and diphenylpotassium lithium.

Although it is appreciated that when R, in the above defined general formula, does not comprise at least one hydrocarbon radical, the group I, II and III metal compounds of the present invention can not normally be termed organometallic compounds, compounds lacking at least one hydrocarbon radical comprise such a relatively small number of the total number of compounds included by said general formula that for the purposes of the present invention, it is intended that these compounds be included within the generic term, organometallic compound. Accordingly, in the specification and in the claims, it is intended, and therefore it should be understood, that the term, organometallic compound, refers to all the compounds included with in the scope of the above defined general formula.

Polymerization of the olefinic charging stock can be accomplished in the gas phase, but it is highly desirable to effect polymerization in the presence of a substantially inert liquid reaction medium which functions as partial solvent for the monomer, a solvent for the organometallic compound, and as a liquid transport medium to remove normally solid polymerization products as a dispersion from the polymerization reactor, thus permitting efficient and continuous polymerization operations. Accordingly, an inert liquid reaction medium is preferably supplied to the reaction zone.

Various classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as propane, butanes, n-pentane, n-hexane, 2,3-dimethylbutane, n-octane, isooctane (2,2,4-trimethylpentane), n-decane, n-dodecane, cyclohexane, methylcyclohexane, dimethylcyclopentane, ethylcyclohexane, decalin, methyl-decalins, dimethyldecalins and the like are suitable.

Also members of the aromatic hydrocarbon series, such as ethylbenzene, isopropylbenzene, sec-butylbenzene, t-butylbenzene, ethyltoluene, ethylxylenes, hemimellitene, pseudocumene, perhnitene, isodurene, diethylbenzenes, isoamylbenzene, and particularly the mononuclear aromatic hydrocarbons such as benzene, toluene, xylenes, mesitylene and xylene-p-cymene mixtures, and the like are completely suitable. Aromatic hydrocarbon fractions obtained by the selective extraction of aromatic naphthas, from hydroforming operations such as distillates or bottoms, from cycle stock fractions of cracking operations, etc., and certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons and the like are also suitable.

The ratio of surface halogenated group IVB metal oxide to organometallic compound utilized in preparing the catalyst is not usually a critical feature of the process. Moreover such a ratio in itself is not particularly meaningful because as indicated above the efficiency of a surface chlorinated group IVB oxide is highly dependent upon the extent of surface halogenation. Accordingly, such a ratio in order to be meaningful must be a function of the extent of surface halogenation. We have found from experience that a molar ratio of from 0.05 to 10 moles of the organometallic compound per mol of surface halogen (of the proper type) is to be preferred.

The quantity of catalyst i.e., comprising both halogenated group IVB metal oxide and group I, II or III metal compound to be utilized in the polymerization reaction may vary from very small amounts to very large amounts, the precise proportion being selected for use being dependent upon the desired rate of polymerization, the geometry of the reaction zone, the composition of the particular olefinic charging stock, temperature and other reaction variables. It should be pointed out that in general the efficiency of the catalysts of the present invention is extremely high and accordingly the total quantity of catalyst that need be employed based on the weight of the charging stock is very small particularly when a fine particle oxide is utilized.

Harmful impurities in the liquid hydrocarbon reaction medium can be effectively neutralized prior to the formation therein, or addition thereto, of the catalyst or catalyst components by treating the liquid medium with a metal alkyl as set forth in a copending application of Adam Orzechowski and James C. MacKenzie, U.S. Serial No. 730,519, filed April 24, 1958, now abandoned. The olefinic charging stocks can be purified by any known means such as bubbling said stocks through a solution of a metal alkyl in a hydrocarbon solvent prior to their introduction into the polymerization reactor.

Temperature control during the course of the polymerization process can be readily accomplished owing to the presence in the reaction zone of a large liquid mass having relatively high heat capacity. The liquid hydrocarbon reaction medium can be cooled by heat exchange inside or outside the reaction zone.

The contact time or space velocity employed in the polymerization process will be selected with reference to the other process variables such as the particular catalysts utilized, the specific type of product desired, and the extent of olefin conversion desired in any given run or pass over the catalyst. In general, this variable is readily adjustable to obtain the desired results.

There follow a number of illustrative non-limiting examples:

*Example 1*

A one liter stainless steel autoclave was charged with 2.8 g. of 85% anatase titanium dioxide having a particle diameter of about 330 A. which had previously been heated for 24 hours at 120° C. and subsequently refluxed in isooctane for about 2.5 hours, 207 g. of isooctane and 0.2 g. of triisobutyl aluminum which was charged under the surface of the isooctane. A total of 31 g. of ethylene was charged into the autoclave. The contents of the autoclave were continuously stirred and the temperature thereof maintained at about 85° C. for 4 hours. The initial pressure at room temperature was 215 p.s.i. and the maximum pressure was about 342 p.s.i. The reaction products were analyzed and it was found that 1.4 g. of ethylene had been converted to an extremely high molecular weight polymer which was essentially insoluble in boiling xylenes. This polymer was found to have a crystalline melting point of about 125° C. and was a tough flexible material. It was further found that none of the ethylene had been converted to normally gaseous or normally liquid products.

When either triisobutyl aluminum or titanium dioxide alone were used as the catalyst, ethylene was not converted to a solid polymer.

*Example 2*

This example was a duplicate of Example 1 except that the titanium dioxide instead of being refluxed in isooctane was refluxed in a one molar solution of thionyl chloride in isooctane for about 16 hours at which time the chlorine content of the chlorinated tritanium dioxide had reached 3.3% by weight on the dry basis. The chlorinated titanium dioxide was then repeatedly washed with isooctane and the wash solution tested to insure the non-exitence therein of titanium tetrachloride. Also, in this example, because ethylene was continuously readily consumed during the run, an additional 87 g. of ethylene was charged into the autoclave during the run in addition to the original ethylene charge of 31 g., to give a total ethylene charge of 118 g.

The reaction products were analyzed and it was found that 101.39 g. of ethylene had been converted to an extremely high molecular weight polymer which was found to have a crystalline melting point of about 130° C. and was a tough, flexible material.

It was further found that none of the ethylene had been converted to normally gaseous or normally liquid products.

When the chlorinated titanium dioxide alone was utilized as a catalyst, ethylene was not converted to a solid polymer.

Substantially the same results can be obtained by substituting titanium dioxide treated with HBr for 5 hours at a temperature of about 240° C. for the aforesaid chlorinated titanium dioxide.

*Example 3*

A one liter stainless steel autoclave was charged with 4 g. of zirconium dioxide having a particle size less than 5 microns which had previously been heated for 24 hours at 120° C. and subsequently refluxed in isooctane for about 2.5 hours, 124 g. of isooctane, and 0.8 g. of triisobutyl aluminum which was charged under the surface of the isooctane. A total of 34.6 g. of ethylene was charged into the autoclave. The contents of the autoclave were continuously stirred and the temperature thereof maintained at 85° C. for 4 hours. The initial maximum pressure was about 350 p.s.i.g. The reaction products were analyzed and it was found that 0.6 g. of ethylene had been converted to an extremely high molecular weight polymer which was essentially insoluble in boiling xylenes. This polymer was found to have a crystalline melting point of about 129° C. and was a tough, flexible material. It was further found that none of the ethylene had been converted to normally gaseous or normally liquid products.

*Example 4*

This example was a duplicate of Example 3 except that the zirconium dioxide instead of being refluxed in isooctane was refluxed in a one molar solution of thionyl chloride in isooctane for 12 hours at which time the chlorine content of the treated oxide represented 1.5% by weight on the dry basis. The chlorinated zirconium dioxide was then repeatedly washed with benzene and the wash solution tested to insure the non-existence therein of zirconium tetrachloride. Also in this example because ethylene was continuously readily consumed during the run, an additional 59.5 g. of ethylene was charged into the autoclave during the run in addition to the original ethylene charge of 34.6 g., to give a total ethylene charge of 94.1 g.

The reaction products were analyzed and it was found that 74.5 g. of ethylene had been converted to an extremely high molecular weight polymer which was found to have a crystalline melting point of about 123° C. and was a tough, flexible material. Substantially the same results can be achieved if surface brominated zirconium dioxide is utilized in this example instead of surface chlorinated zirconium dioxide.

*Example 5*

A 425 cc. stainless steel bomb was charged with 7.5 g. of surface chlorinated thorium dioxide having a particle diameter of about 0.5 to 2 microns and containing 1.06% by weight chlorine, which had been prepared by heating the thorium dioxide particles for 24 hours at 120° C., subsequently refluxing said dioxide in a 0.3 molar solution of thionyl chloride in isooctane for about 13 hours and finally repeatedly washing with isooctane, 103.5 g. of isooctane, and 0.8 g. of triisobutyl aluminum which was charged under the surface of the isooctane.

22 g. of ethylene was charged to the bomb. The contents of the bomb were agitated and the temperature thereof maintained at 50° C. for 89.5 hours. The initial pressure at room temperature was 320 p.s.i. The reaction products were analyzed and it was found that 5.2 g. of ethylene had been converted to an extremely high molecular weight polymer which was essentially insoluble in boiling xylenes. This polymer was found to have a crystalline melting point of about 130° C. and was a tough, flexible material. It was further found that none of the ethylene had been converted to normally gaseous or normally liquid products. Substantially the same results can be achieved by substituting iodinated thorium dioxide for chlorinated thorium dioxide in the above example.

*Example 6*

A 425 cc. stainless steel bomb was charged with 7.4 g. of surface chlorinated titanium dioxide pellets containing 2.28% by weight chlorine having an average particle diameter of about +60 mesh which had been prepared by heating the titanium dioxide pellets for 24 hours at 120° C., subsequently refluxing them in a one molar solution of thionyl chloride in isooctane for about 13 hours and repeatedly washing then with isooctane, and 1 g. of triisobutyl aluminum. A total of 76 g. of propylene was charged to the bomb. The contents of the bomb were then agitated and the temperature thereof maintained at 50° C. for 40 hours. The initial pressure at room temperature was about 178 p.s.i. and the maximum pressure was about 196 p.s.i. The reaction products were analyzed and it was found that 1.7 g. of propylene had been converted to an extremely high molecular weight polymer which was essentially insoluble in boiling diethylbenzene. This polymer was found to have a crystalline melting point of about 162° C. and was a tough, flexible material. It was further found that none of the propylene had been converted to normally gaseous or normally liquid products.

In one embodiment of the present invention, hydrogen is introduced into the reaction zone during the polymerization reaction. The introduction of hydrogen is not essential but generally substantially improves the yield and produces a larger proportion of xylene-soluble product. Although, the exact function of the hydrogen is not completely understood, and there is therefore no intention to be bound by this explanation, it is believed that the hydrogen serves as a chain transfer agent, thereby promoting the dissociation of polymer chains from the polymerization sites of the catalyst and aiding in the initiation and formation of additional polymer chains on said catalyst sites.

A non-limiting illustrative example follows:

*Example 7*

This example is a duplicate of Example 6 except that prior to charging the propylene into the bomb, $2 \times 10^{-2}$ mols of hydrogen were charged into the bomb. The contents of the bomb were agitated and the temperature thereof maintained at 50° C. for 64 hours. The reaction products were analyzed and it was found that 14.7 g. of propylene had been converted to an extremely high molecular weight polymer which was soluble in boiling diethylbenzene. The polymer was found to have a crystalline melting point of about 163° C. and was a tough, flexible material. It was further found that none of the propylene had been converted to normally gaseous or liquid products.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the polyolefins.

Also, the polymers produced by the process of the present invention, especially the polymers having high specific viscosities, can be blended with the lower molecular weight polyethylenes to impart stiffness or other desired properties thereto. The solid resinous products produced by the process of the present invention can, likewise, be blended in any desired proportions with hydrocarbon oils, waxes, such as paraffin or petrolatum waxes, with ester waxes, with high molecular weight polybutylenes, and with other organic materials. Small proportions between about 0.01 and about 1 percent of the various polymers produced by the process of the present invention can be dissolved or dispersed in hydrocarbon lubricating oils to increase V.I. and to decrease oil consumption when the compounded oils are employed in motors. The polymerization products having molecular weights of 50,000 or more, can be employed in small proportions to substantially increase the viscosity of fluent liquid hydrocarbon oils and as gelling agents for such oils.

The polymers produced by the present process can also be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected. The polymers of our invention can also be cross-linked by high energy X-rays (about 0.5 to 2.5 m.e.v. or more) or by radioactive materials or can be chemically cross-linked to effect increases in softening temperature, etc.

Obviously many changes may be made in the above described examples and procedure without departing from the scope of the invention. For example, although only surface chlorinated, brominated and iodinated IVB metal oxides were mentioned in the above examples, surface fluorinated group IVB metal oxides are also suitable for the purposes of the present invention. For example, surface fluorinated zirconium dioxide is entirely suitable.

Also, coformed group IVB metal oxides or group IVB metal oxides coformed with or mixed with other compounds are suitable for the purposes of the present invention. For example, titanium or zirconium silicates can be utilized in place of the oxides as the base material for halogenation.

Accordingly, it is intended that the above disclosure be regarded as illustrative and as in no way limiting the scope of the invention.

What I claim is:

1. A process for polymerizing α-mono-olefins and mixtures thereof which comprises contacting at temperatures between about −20° and 250° C. a substance chosen from the group consisting of ethylene, propylene, butene-1 and mixtures thereof, with a catalyst comprising a dioxide of a group IVB metal having halogen chemically bound thereto and a compound conforming to the general formula:

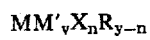

$$MM'_vX_nR_{y-n}$$

wherein M is chosen from the group consisting of the metals of groups I, II and III; M' is a metal of group I; $v$ is a number from 0 to 1; each X is any halogen; $n$ is a number from 0 to 2; each R is chosen from the group consisting of any monovalent hydrocarbon radical and hydrogen; $y$ is a number from 1 to 4; and wherein $y-n$ equals at least one.

2. The process of claim 1 wherein said group IVB metal is chosen from the group consisting of titanium, zirconium and thorium.

3. The process of claim 1 wherein said dioxide of a group IVB metal is chosen from the group consisting of dioxides having chlorine chemically bound thereto, dioxides having bromine chemically bound thereto and dioxides having iodine chemically bound thereto.

4. The process of claim 1 wherein said dioxide of a group IVB metal has chlorine chemically bound thereto.

5. An improved catalyst for polymerizing α-monoolefins and mixtures thereof which comprises a dioxide of a group IVB metal having halogen chemically bound thereto and a compound of a group I, II or III metal conforming to the general formula:

$$MM'_v X_n R_{y-n}$$

wherein M is chosen from the group consisting of the metals of group I, II and III; M' is a metal of group I; $v$ is a number from 0 to 1; each X is any halogen; $n$ is a number from 0 to 2; each R is chosen from the group consisting of any monovalent hydrocarbon radical and hydrogen; $y$ is a number from 1 to 4; and wherein $y-n$ equals at least one.

6. The catalyst of claim 5 wherein said group IVB metal is chosen from the group consisting of titanium, zirconium, and thorium.

7. The catalyst of claim 5 wherein said dioxide is chosen from the group consisting of oxides having chlorine chemically bound thereto, oxides having bromine chemically bound thereto, and oxides having iodine chemically bound thereto.

8. The catalyst of claim 5 wherein said dioxide has chlorine chemically bound thereto.

9. The catalyst of claim 5 wherein said compound conforming to the general formula:

$$MM'_v X_n R_{y-n}$$

is aluminum alkyl.

References Cited in the file of this patent

UNITED STATES PATENTS

| | | |
|---|---|---|
| 2,886,561 | Reynolds et al. | May 12, 1959 |
| 2,908,674 | Nowlin et al. | Oct. 13, 1959 |
| 2,909,512 | Bruce | Oct. 20, 1959 |
| 2,912,421 | Juveland et al. | Nov. 10, 1959 |
| 2,959,576 | Payne | Nov. 8, 1960 |
| 3,007,905 | Bailey | Nov. 7, 1961 |
| 3,009,827 | Zurich et al. | Nov. 21, 1961 |

FOREIGN PATENTS

| | | |
|---|---|---|
| 807,204 | Great Britain | Jan. 7, 1959 |

OTHER REFERENCES

"Chemical Behavior of Zirconium," by Blumenthal, D. Van Nostrand Company, Inc., 1958, page 168.

UNITED STATES PATENT OFFICE
CERTIFICATE OF CORRECTION

Patent No. 3,102,877                          September 3, 1963

James C. MacKenzie

It is hereby certified that error appears in the above numbered patent requiring correction and that the said Letters Patent should read as corrected below.

Column 1, line 63, for "carbon monoxidechlorine" read -- carbon monoxide-chlorine --; column 2, line 55, for "nearly" read -- entirely --; column 5, line 43, for "85%" read -- 95% --; line 71, for "tritanium" read -- titanium --; line 75, for "non-exitence" read -- non-existence --; column 7, line 24, for "then" read -- them --.

Signed and sealed this 25th day of February 1964.

(SEAL)
Attest:

ERNEST W. SWIDER

Attesting Officer

EDWIN L. REYNOLDS
                                   Acting Commissioner of Patents